(12) United States Patent
Vemuri

(10) Patent No.: US 10,890,161 B1
(45) Date of Patent: Jan. 12, 2021

(54) EMBEDDED ELECTRICAL ENERGY PLATFORM

(71) Applicant: Bhaskar R Vemuri, Lowell, MA (US)

(72) Inventor: Bhaskar R Vemuri, Lowell, MA (US)

(*) Notice: Subject to any disclaimer, the term of this patent is extended or adjusted under 35 U.S.C. 154(b) by 0 days.

(21) Appl. No.: 14/809,410

(22) Filed: Jul. 27, 2015

Related U.S. Application Data

(60) Provisional application No. 62/070,295, filed on Aug. 20, 2014.

(51) Int. Cl.
*F03D 9/00* (2016.01)
*F03D 9/02* (2006.01)
*F03D 11/04* (2006.01)

(52) U.S. Cl.
CPC ............. *F03D 9/007* (2013.01); *F03D 9/021* (2013.01); *F03D 11/04* (2013.01)

(58) Field of Classification Search
CPC ................ Y02E 10/723; Y02E 10/725; H02P 2009/004; F03D 9/007
USPC .............................................. 290/44, 55, 50
See application file for complete search history.

(56) References Cited

U.S. PATENT DOCUMENTS

| | | | | |
|---|---|---|---|---|
| 2,832,985 A * | 5/1958 | Durling | ................. | G03D 15/00 134/99.1 |
| 2,941,613 A * | 6/1960 | Di Perna | ................. | B60K 16/00 180/2.2 |
| 4,119,863 A * | 10/1978 | Kelly | ................. | F03D 3/02 136/246 |
| 5,280,827 A * | 1/1994 | Taylor | ................. | B60K 1/04 180/165 |
| 5,512,787 A * | 4/1996 | Dederick | ................. | F03D 9/007 290/4 R |
| 5,746,283 A * | 5/1998 | Brighton | ................. | B60K 16/00 180/65.31 |
| 6,097,104 A * | 8/2000 | Russell | ................. | F03D 9/008 290/54 |
| 6,700,215 B2 * | 3/2004 | Wu | ................. | B60K 16/00 290/44 |
| 6,897,575 B1 * | 5/2005 | Yu | ................. | B60K 16/00 180/65.265 |
| 7,215,037 B2 * | 5/2007 | Scalzi | ................. | B60K 16/00 290/44 |
| 7,488,150 B2 * | 2/2009 | Krippene | ................. | F03D 1/04 415/4.2 |
| 8,098,040 B1 * | 1/2012 | Botto | ................. | B60L 8/006 290/44 |
| 8,253,262 B1 * | 8/2012 | Kiler | ................. | B60L 8/003 290/44 |
| 8,299,645 B2 * | 10/2012 | Muchow | ................. | F03D 1/001 290/55 |
| 8,614,523 B2 * | 12/2013 | Reynolds | ................. | F01D 1/22 290/54 |

(Continued)

FOREIGN PATENT DOCUMENTS

WO WO 2014196921 A1 * 12/2014 ............. F03B 13/22

*Primary Examiner* — Charles Reid, Jr.
(74) *Attorney, Agent, or Firm* — Lambert Shortell & Connaughton; Gary E. Lambert; David J. Connaughton, Jr.

(57) ABSTRACT

Devices, systems, and methods disclosed for generating embedded clean electrical energy. Particular aspects of the invention disclosed for design and integration of a micro wind generator array and a solar panel to form a micro-embedded electrical energy system. The embedded electrical energy system facilitates to produce more watts per hour in a most efficient way per square meter.

1 Claim, 14 Drawing Sheets

(56) References Cited

U.S. PATENT DOCUMENTS

| | | | | |
|---|---|---|---|---|
| 8,704,394 B1* | 4/2014 | Jones | F03D 80/70 | 290/44 |
| 8,736,098 B2* | 5/2014 | Choi | F03D 1/025 | 290/55 |
| 8,791,587 B2* | 7/2014 | Smith, Jr. | H02K 7/183 | 290/54 |
| 9,062,654 B2* | 6/2015 | Yost | F03D 1/04 | |
| 9,331,534 B2* | 5/2016 | Yost | H02K 1/2793 | |
| 9,428,061 B1* | 8/2016 | Ripley | B60L 8/006 | |
| 2003/0155464 A1* | 8/2003 | Tseng | B60K 16/00 | 244/58 |
| 2006/0213697 A1* | 9/2006 | Sutherland | B60K 6/46 | 180/2.2 |
| 2008/0150288 A1* | 6/2008 | Fein | B82Y 15/00 | 290/55 |
| 2008/0150290 A1* | 6/2008 | Fein | B60K 16/00 | 290/55 |
| 2008/0196758 A1* | 8/2008 | McGuire | F03D 9/007 | 136/245 |
| 2009/0167028 A1* | 7/2009 | Akamine | F03D 15/10 | 290/55 |
| 2009/0315330 A1* | 12/2009 | Dederick | F03B 13/268 | 290/53 |
| 2010/0133846 A1* | 6/2010 | Lin | F03D 3/061 | 290/55 |
| 2010/0253087 A1* | 10/2010 | Lauke | F03D 1/065 | 290/55 |
| 2011/0031043 A1* | 2/2011 | Armani | F03D 9/00 | 180/2.2 |
| 2011/0037261 A1* | 2/2011 | Champ | F03D 3/005 | 290/44 |
| 2011/0133454 A1* | 6/2011 | Vo | F03D 9/007 | 290/44 |
| 2011/0156392 A1* | 6/2011 | Thacker, II | H02P 9/04 | 290/44 |
| 2011/0316279 A1* | 12/2011 | Bahari | F03D 1/04 | 290/44 |
| 2012/0074712 A1* | 3/2012 | Bursal | F03D 1/025 | 290/55 |
| 2013/0106193 A1* | 5/2013 | Bryson | F03D 9/007 | 307/73 |
| 2013/0119662 A1* | 5/2013 | Thacker, II | F03D 3/0472 | 290/44 |
| 2014/0217740 A1* | 8/2014 | McMahon | F03D 3/002 | 290/55 |
| 2014/0327244 A1* | 11/2014 | Angoli | F03D 9/007 | 290/55 |
| 2015/0240786 A1* | 8/2015 | Dietzel | F03D 9/021 | 290/44 |
| 2015/0244220 A1* | 8/2015 | Yost | H02K 1/2793 | 310/156.12 |
| 2016/0084227 A1* | 3/2016 | Krippene | F03D 9/002 | 290/55 |

* cited by examiner

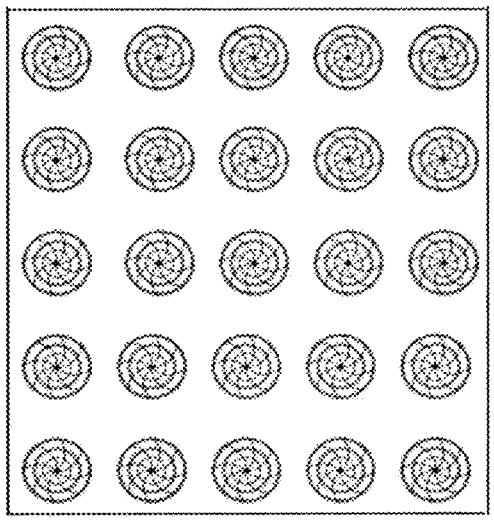
FIG. 1E
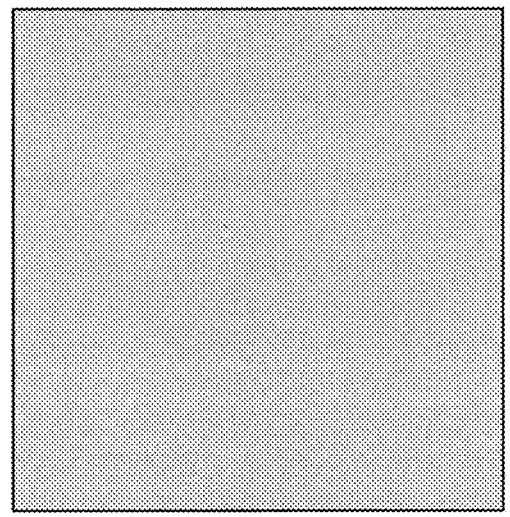
FIG. 1F
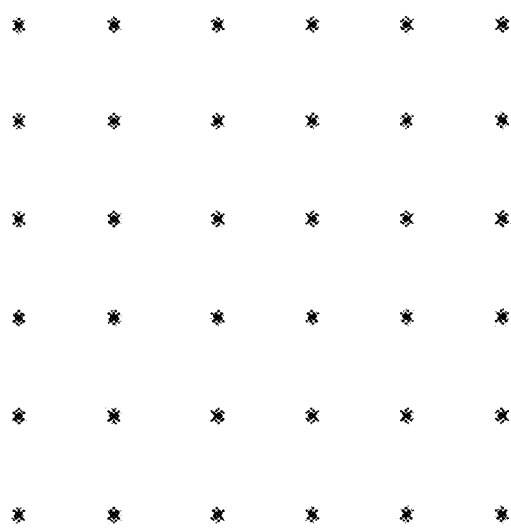
FIG. 1G
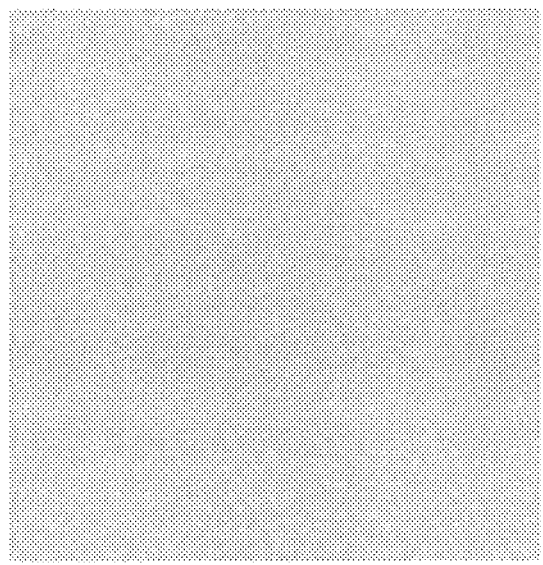
FIG/ 1H

EMBEDDED ELECTRICAL ENERGY PLATFORM

CROSS-REFERENCE TO RELATED CASES

This patent application claims priority from U.S. Provisional Patent Application 62/070,295 filed on Aug. 20, 2014, which is incorporated by reference in its entirety.

BACKGROUND

Production of electrical energy by solar panels depends on the availability of Sunlight. Production of electrical energy by wind generators depends on the availability of moving wind. In the existing electrical energy markets both techniques are less efficient, and I needs more expensive infrastructure when they work in a stand-alone state.

The stand-alone wind energy and solar panel energy projects have also raised many Issues. The wind generator in the present day market is not portable. It is very heavy, and needs expensive infrastructure with large rotating blades. Populated urban areas are reluctant to allow such wind generator farms because of its odd appearance. The large wind generator produce lot of noise, and its large rotating blades are not Eco-friendly. Large open land is required for wind generator farm or solar panel farm. The planning and construction of Hybrid Electrical Energy Plant is not cost effective with a storage battery plant connected with separate transmission lines form a solar panel farm, and a wind generator farm. My Invention, "Embedded Electrical Energy Platform" has resolved issues related to infrastructure costs, and implemented realistic and cost effective methods to generate electrical energy.

The Embedded Electrical Platform of the present invention, with a single-shaft wind turbine is compact, scalable and available in the form of one physical frame that can be bolted on the top of goods carrying railway wagon, or on the top of goods carrying truck-trailer. This version of mobile platform can produce more watt-hours per square meter area, and derive the energy from the surrounding atmosphere more efficiently.

The Embedded Electrical Energy Platform with a double-shaft wind turbine is used on non-mobile structures. This version of platform is used in farms and research camps or camps with some other purpose in remote areas. The Embedded Electrical Energy Platforms can be installed, and interconnected quickly for electrical energy production with less effort. Portability and profitability of electrical energy production issues are addressed by changing the method of approach to generate electrical energy.

The available empty space on railway goods wagons, goods carrying truck-trailers, and waste space available in farmland is utilized more effectively by combining wind and solar electrical energy generating sources together as a single frame of Embedded Electrical Energy Platform. It is more portable and scalable, and a profitable platform. It has increased overall production time of the electrical energy by combining the micro wind generator array and a solar panel together to form a portable Embedded Electrical Energy Platform. It is profitable and cost effective because the Embedded Clean Electrical Energy Platform is designed to produce more Watts per Hour, and per square meter area in a most efficient way.

The Embedded Micro Wind Generator Array is capable of producing a consistent stream of electrical energy when encompassed by a solar panel. Several hours of continuous electrical energy production is possible when installed on a railway goods wagon or on the top of truck-trailer.

The micro wind generator array operates quietly under solar panel. Installation cost of the Embedded Electrical Energy Platform is not expensive when compared to a heavy wind generator. The Embedded Electrical Energy Platform installation can be expanded quickly in a limited time. Storing and transmission of generated electrical energy to the nearest local electrical grid is much cost effective to increase the profitability. Monitoring and maintenance is less expensive.

BRIEF SUMMARY OF THE INVENTION

The Invention is an Embedded Clean Hybrid Electrical Energy Platform. The Platform comprises micro wind generators driven by the micro wind turbines. The micro wind generator array and a solar panel are stacked together to form a platform called "Embedded Clean Hybrid Electrical Energy Platform." The Platform is off-the-shelf Embedded Hybrid Stack to produce more watt-hours of electrical energy in less space.

The Embedded Hybrid Electrical Energy Platform is scalable to meet the business requirements. The Platform design is intended to increase the watt-hours generated per square meter area, and to increase the profits on capital investment.

The integrated frame is designed to increase the overall production time of the electrical energy, and to eliminate the overhead costs of land requirement for installation. Transmission losses of power are minimized because the solar and micro wind generator stacks share the same infrastructure, in a single frame. Portability and profitability issues are addressed by changing the method of approach to generate electrical energy.

A steady stream of electricity can be generated as long as the goods wagons or trailer-trucks are in motion. Solar panel contributes its part to produce electrical energy as long as sunlight is available. The micro wind generator stack can also produce electrical energy as long as the wind stream is available when goods wagons or trailer-trucks are NOT in motion. Generation cost of electrical energy can be reduced substantially because the design facilitates up to 300 to 400 percent increase in watts/square meter, and reduction in overhead costs like land and transmission.

In a retrofit version, non-mobile stack of double-shaft micro wind generators are installed. The non-mobile stack of double-shaft micro wind generators shares the un-used space behind the solar panels on ground of an existing solar farm. The double-shaft micro wind generator can produce additional electrical energy as long as the wind stream is available in the farm. The retrofit arrangement can also reduce the generation cost and increase the overall output watt-hours.

BRIEF DESCRIPTION OF THE DRAWINGS

FIG. 1E depicts a plan view of micro wind generators installed inside the grid of pins, not covered by a solar panel.

FIG. 1F is an embodiment of solar panel's plan view.

FIG. 1G is a plan view of the grid of pins.

Number 24 represents a view of the baseboard.

Figure 1:
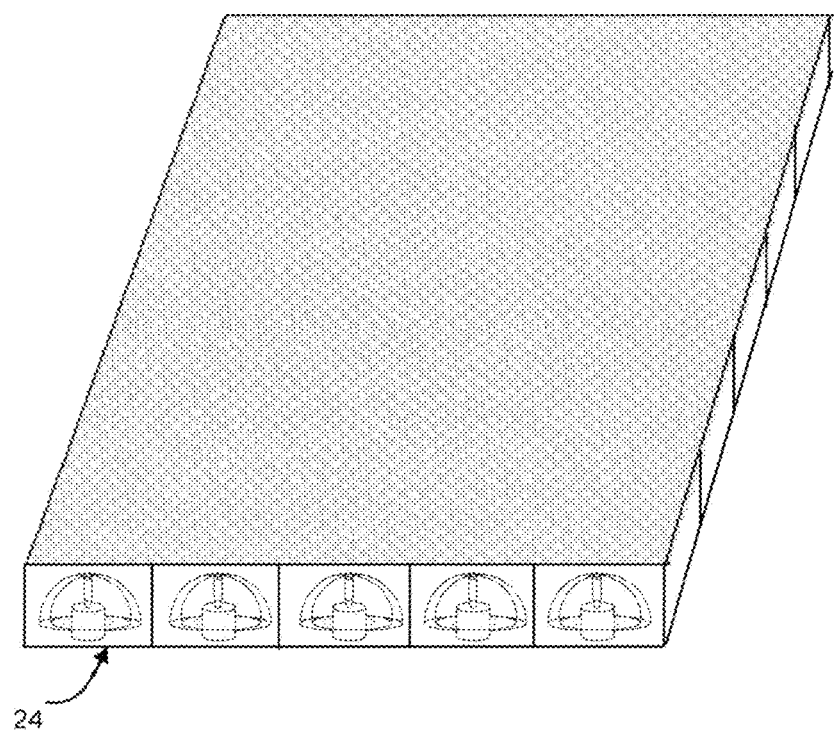
FIG. 1 is an embodiment of Mobile Embedded Hybrid Electrical Energy Platform, hereafter referenced as Gensync unit.
Figure 1A:
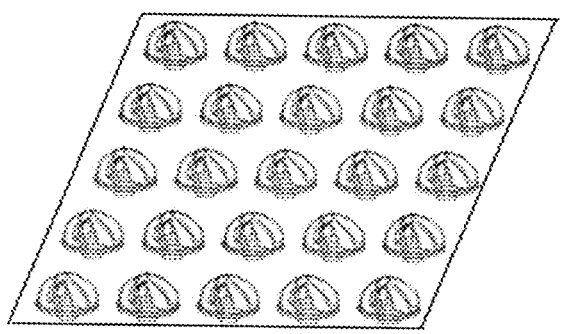
FIG. 1A is an embodiment of micro wind generator array installed, for example, on a printed circuit board and interconnected via electrical circuit to deliver the direct current watts.
Figure 1B:
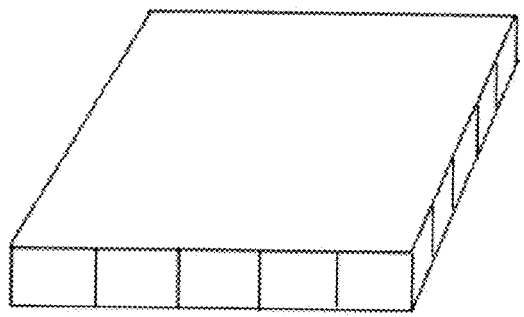
FIG. 1B is an embodiment of mobile embedded hybrid electrical energy platform housing with parallel surfaces, separated and held together by grid of pins, also holding firmly the solar panel and baseboard.
Figure 1C:
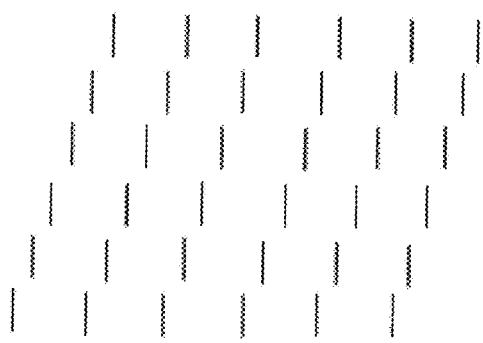
FIG. 1C is an illustration of grid of pins.
Figure 1D:
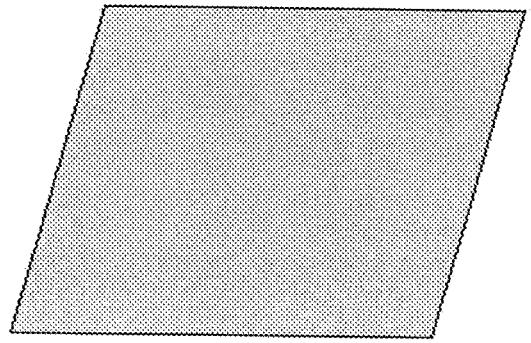
FIG. 1D shows an embodiment of solar panel.

FIG. 1H represents a plan view of the baseboard.

Figure 2:
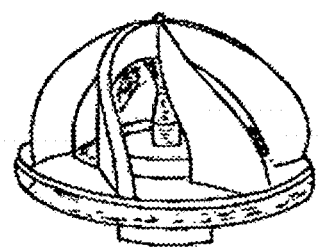

FIG. 2 is an embodiment of single-shaft micro wind generator coupled to a micro wind turbine head.

Figure 2A:
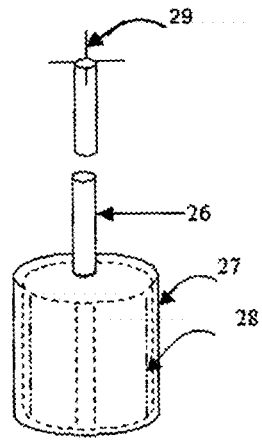

FIG. 2A is an embodiment of micro wind generator with a single-shaft, and a sleeve shaped coupling that connects the micro wind turbine head.

Figure 2B:
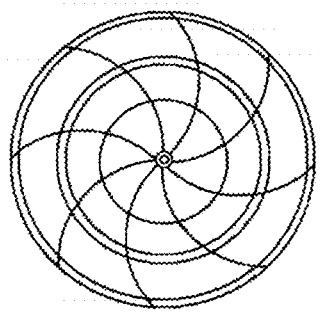

FIG. 2B depicts the plan view of a micro wind turbine head with eight rotating blades around a micro wind generator's stator.

Figure 2C:
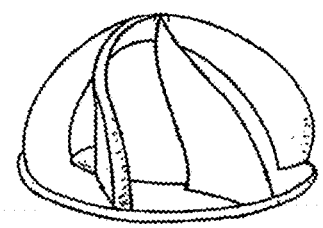
Figure 2D:

FIG. 2C is an embodiment of micro wind turbine head comprising a ring shaped base, connected to a number of curved blades, which capture kinetic energy from wind FIG. 2D is a dynamic balancer that distributes the kinetic energy captured, and optimizes the energy transmission to the shaft of micro wind generator. Dynamic balancer is an integral part of the wind turbine head.

Figure 2E:
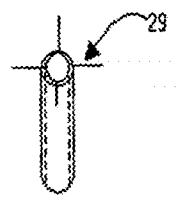
Figure 2F:
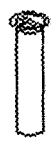

FIG. 2E is a sleeve coupling and its edge fins holds firmly the turbine head, and micro wind turbine shaft together. The edge-fins enters into the gaps between vertical edges of the turbine blades at apex and it form a direct coupling between wind turbine head and micro generator FIG. 2F is a bolt that keeps the micro wind turbine head, micro wind generator shaft and its sleeve coupling with edge fins at apex, and hold them together firmly.

Number 26 represents a single-shaft micro wind turbine generator shaft.

Number 27 represents a single-shaft micro wind turbine generator stator.

Number 28 represents a single-shaft micro wind turbine generator rotor.

Number 29 represents an edge fin of a sleeve coupling.

Figure 3:
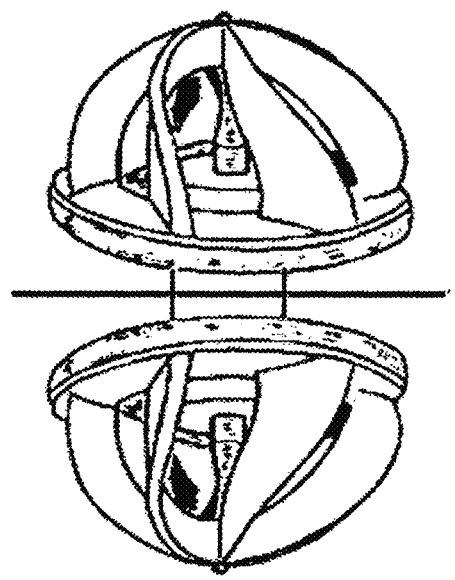

FIG. 3 is an embodiment of double-shaft micro wind generator coupled to micro wind turbine heads. Two micro wind turbine heads are connected to the shaft's ends on both sides of the micro wind generator.

Figure 3A:
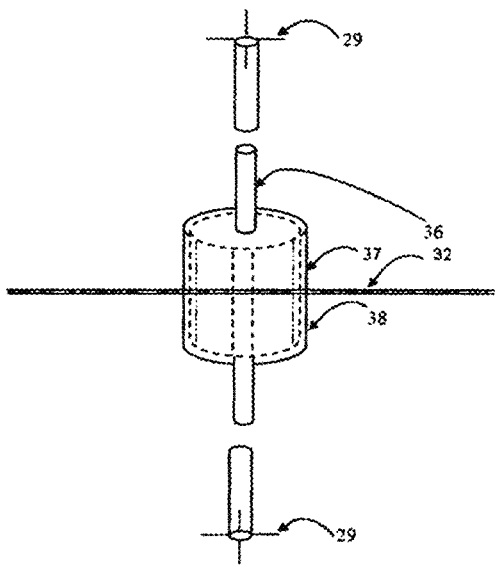

FIG. 3A is an embodiment of double-shaft micro wind generator. The turbine heads are connected to the micro-generator shaft as described in FIG. 2C and FIG. 2F.

Number 32 represents a structural-support to a double-shaft micro wind generator.

Figure 3B:
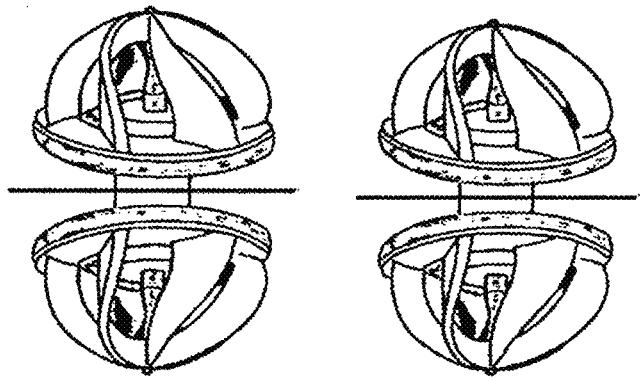

FIG. 3B is an embodiment of double-shaft wind generator stacks, which are scalable to the needs. The double-shaft micro wind generator stacks are non-mobile version of Electrical Energy Platform.

Figure 3C:
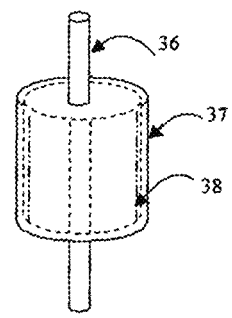

FIG. 3C is an embodiment of a micro wind generator with a double-shaft.

Number 36 represents a double-shaft micro wind turbine generator shaft.

Number 37 represents a double-shaft micro wind turbine generator stator.

Number 38 represents a double-shaft micro wind turbine generator rotor.

Figure 4:
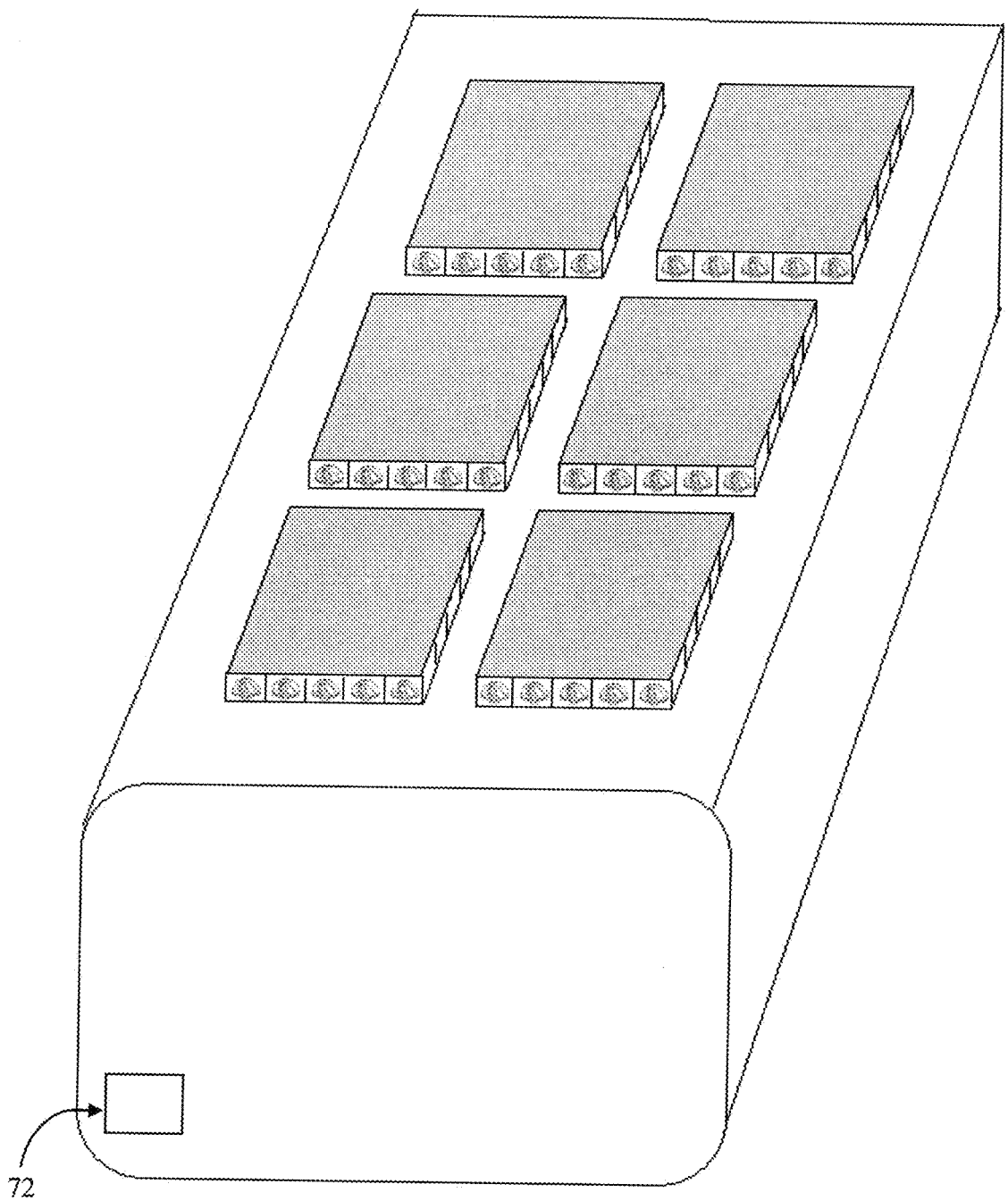

FIG. 4 is an illustration of the layout of Gensync units on a goods wagon rooftop.

Number 72 represents storage battery on a moving goods wagon.

Figure 5:
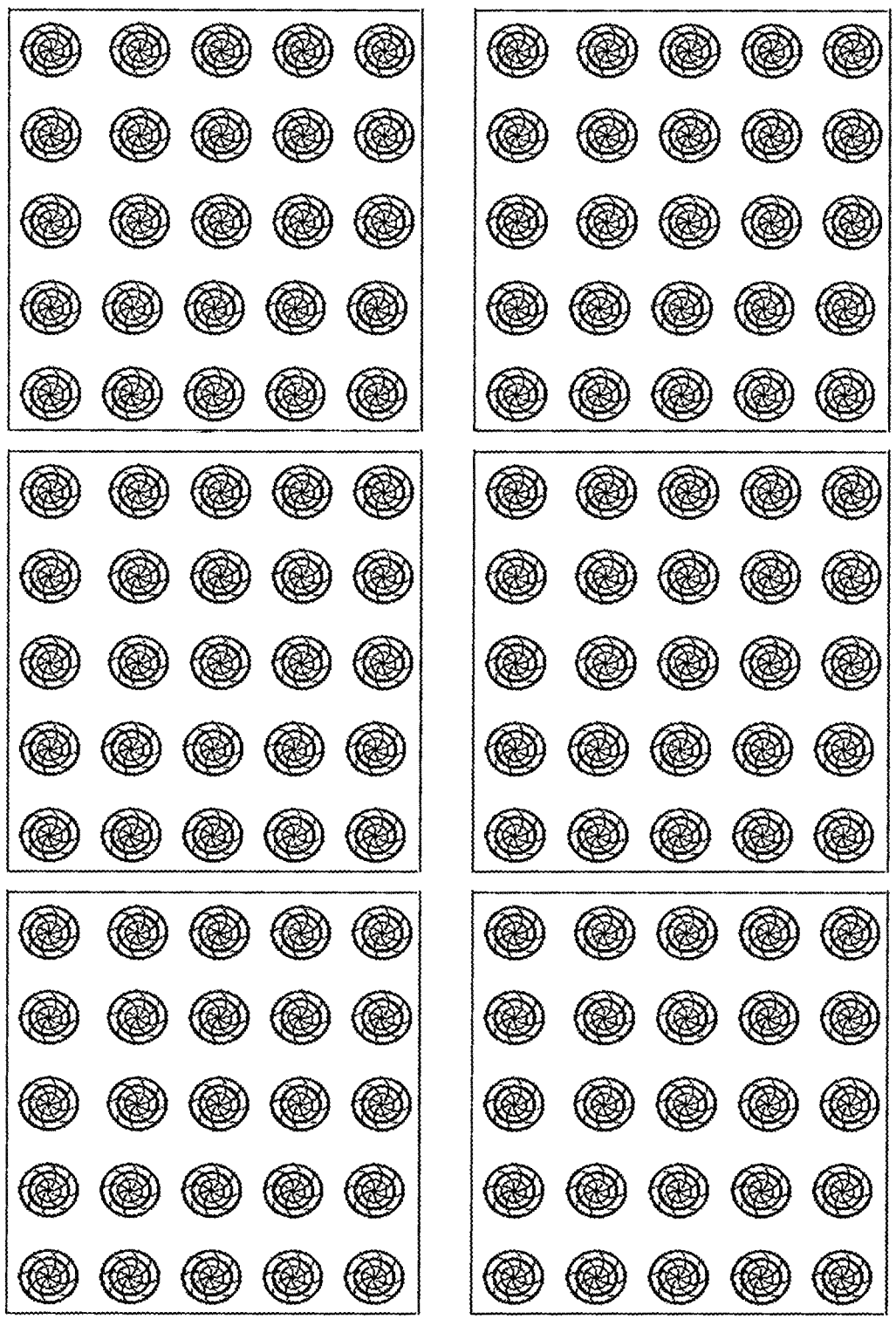

FIG. 5 depicts the plan view of assembled micro wind generator units.

Figure 6:
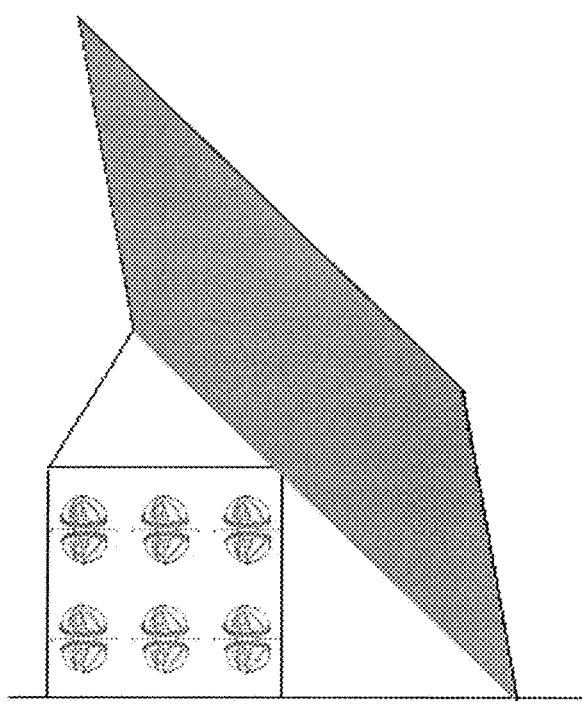

FIG. 6 is an embodiment of adding double-shaft wind generator stacks to the existing solar panel to enhance the electrical energy generation of a solar farm, for example. In this view, a solar panel is at an angle to capture sunlight.

Figure 7:
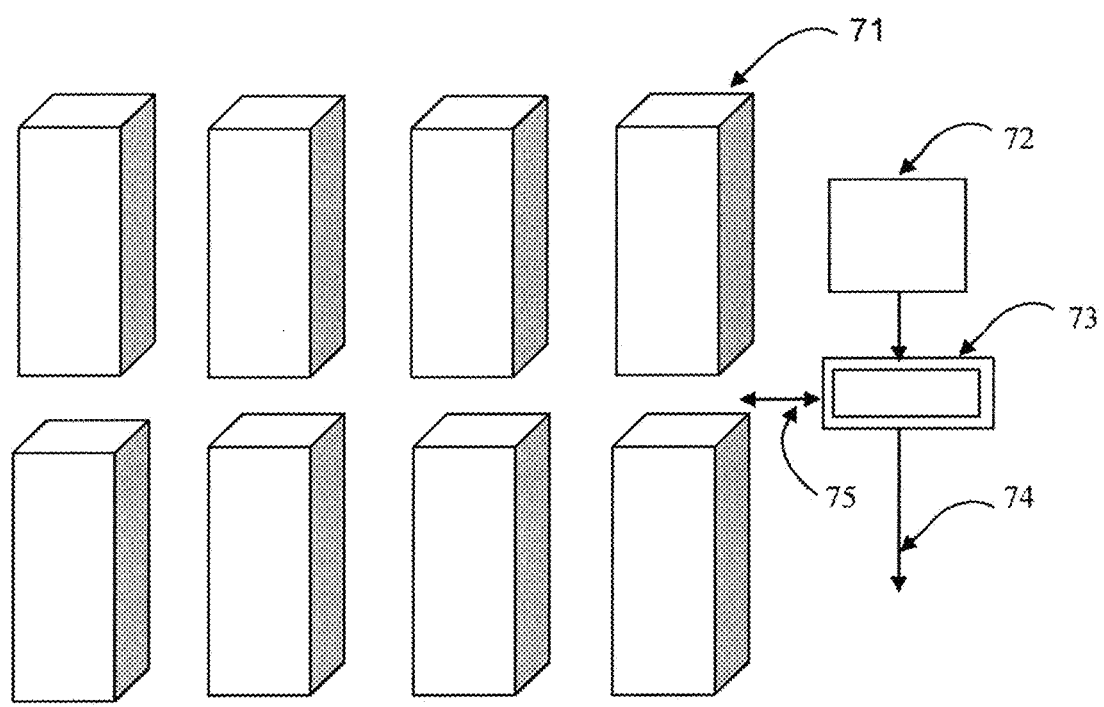

FIG. 7 illustrates the layout of storage batteries and a smart inverter at synchronization facility.

Figure 8:
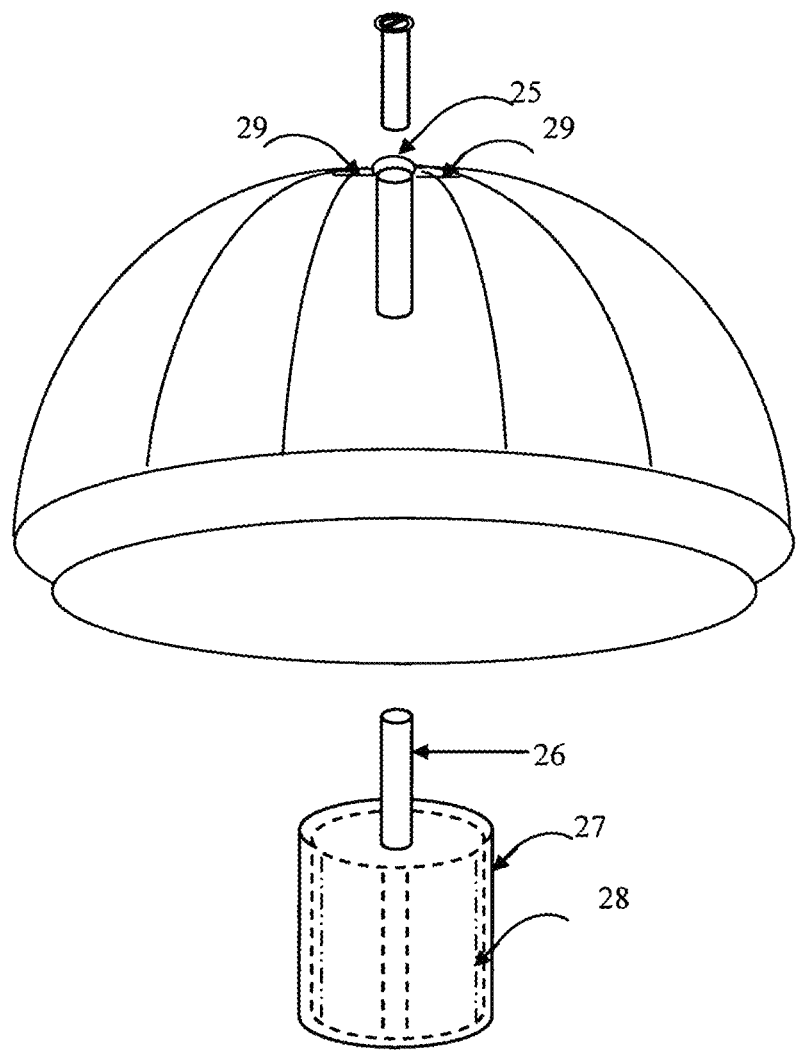

FIG. 8 illustrates the details of the single shaft micro wind turbine generator.

Figure 9:
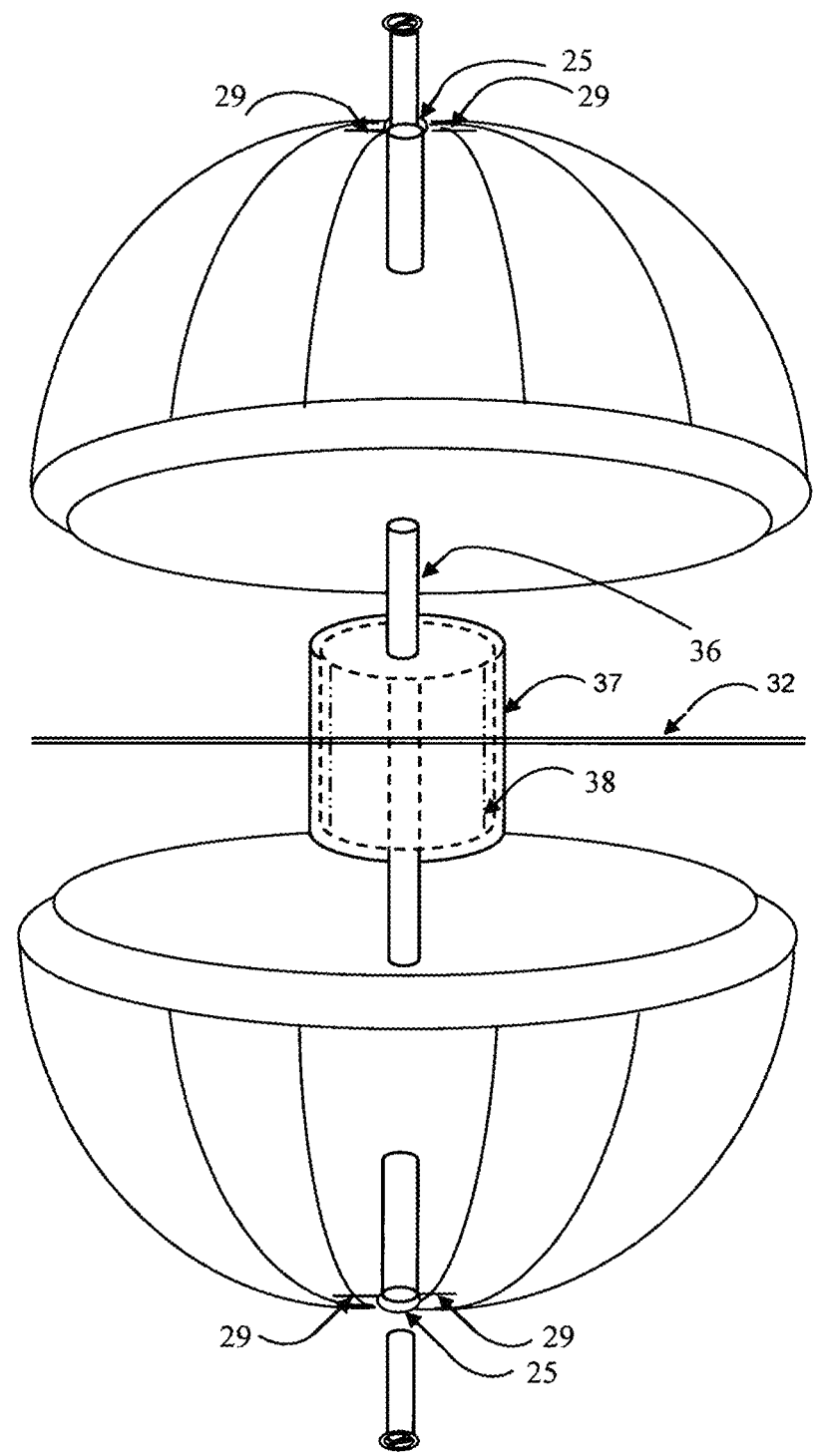

FIG. 9 illustrates the details of the double shaft micro wind turbine generator.

Figure 10:
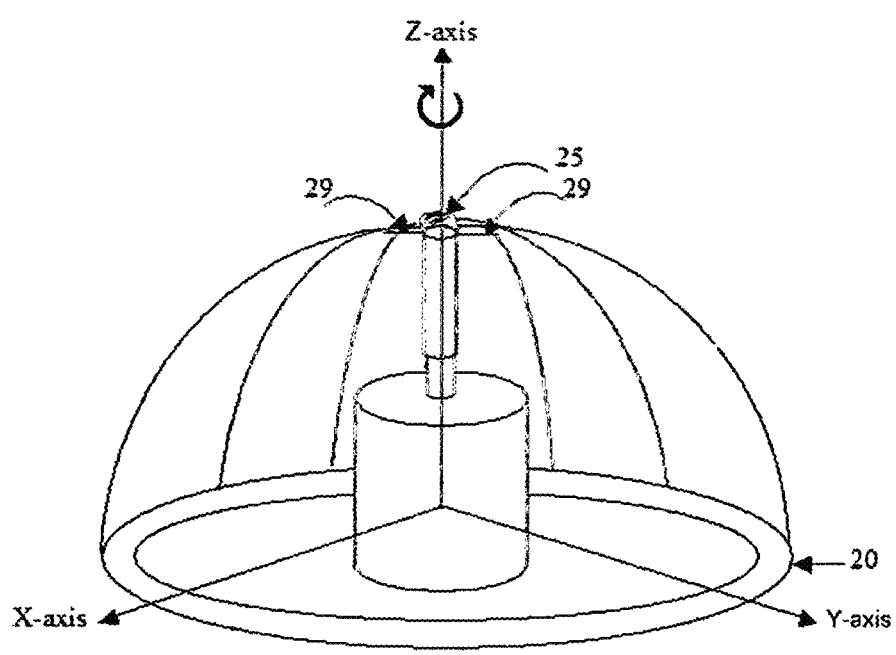
Figure 10A:
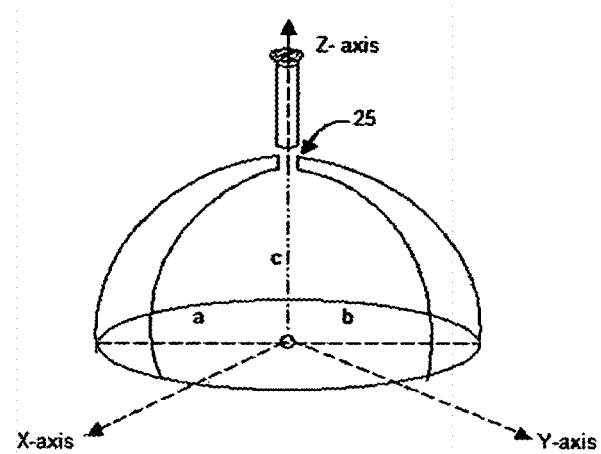
Figure 10B:
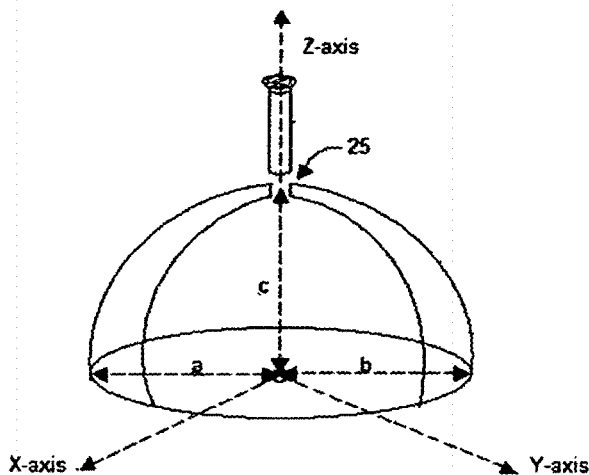

FIG. 10 illustrates the details of the Inflexible sleeve coupling, which connect a head and a micro wind generator shaft to form a direct coupling.

Number 25 represents an apex of micro wind turbine head depicted in FIG. 2C

FIG. 10 A illustrates Z-axis is passing through a hole at apex and perpendicular to X-Y planes.

Number 20 represents a flat bottom side circular base of a micro-turbine head with a diameter equal to a+b, where the width a=b. The micro-turbine head height is equal to C that passes through Z-axis.

FIG. 10 B z-axis passing through center of mass of turbine head and Micro wind turbine head rotates around Z-axis.

Figure 11:
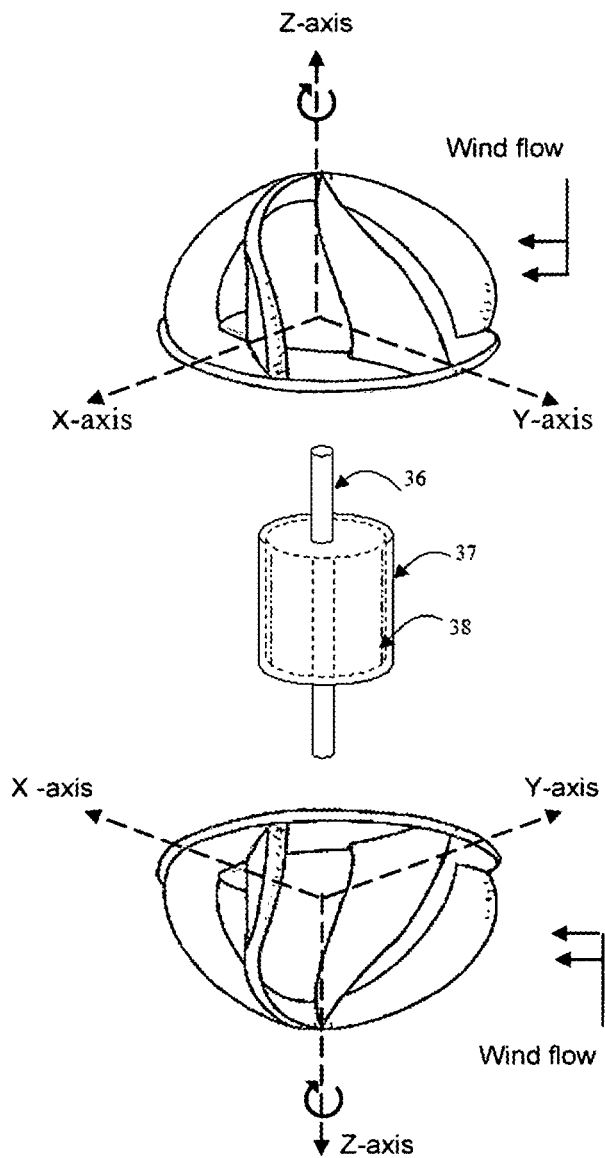

FIG. 11 illustrates a novel method of using two turbine heads with distinctive blade configuration to add torque vectors.

DETAILED DESCRIPTION OF THE INVENTION

The Invention is an embedded Hybrid Electrical Energy Platform. The platform comprises micro wind generators driven by the micro wind turbines. The micro wind generator array and a solar panel are stacked together to form a platform called "Embedded Hybrid Electrical Energy Platform". The platform is off the shelf Embedded Hybrid Stack to produce more watt-hours of clean electrical energy in less space. The embedded hybrid electrical energy platform is scalable to meet the business requirements. The platform design is intended to increase the watt-hours generated per square meter area, and to increase the profits on capital investment.

The platform comprises two subsystems
1. Micro Wind Generators
2. Solar Panels

The micro wind generator array is covered by a solar panel, creating in the process the shape akin to air duct. Wind blows through the duct, and rotates the micro turbine head, which is directly coupled to the shaft of micro wind generator. A steady stream of air flow causes tunneling effect, and create more kinetic thrust to rotate the micro turbine head. The micro wind generator stack and the solar panel together create a more efficient scalable hybrid electrical power generating source.

The micro wind turbine generator design can be produced in two versions:
1. Single-shaft version
2. Double-shaft version The embedded hybrid electrical energy platforms with single-shaft is typically installed on the top of railway goods wagons, and truck-trailers. The platform is scalable for business needs. Typically, the array of a single-shaft micro wind turbine generator lies within the two surfaces of the housing, which are parallel. The single-shaft micro wind generator is directly coupled to a micro wind turbine with a sleeve coupling. The sleeve coupling interlocks the shaft of micro wind turbine and micro wind turbine head. It provides rotational stability to the micro wind turbine head. The micro wind generator's shaft interlocks with blades converging at the apex of the shaft, and facilitates a through bolt to pass through the shaft.

The single-shaft micro wind turbine generator stator housing has four built-in nuts at ninety degrees angle under the housing base. A bolt passing through the baseboard and printed circuit board holds the stator housing to withstand the high velocity wind thrust on the array of micro wind turbine generator.

Typically, housing height is restricted, to a maximum of about six inches (15.24 centimeters). The diameter of the wind turbine head is restricted to a maximum eight inches (20.32 centimeters). The platform is scalable to business needs. The assembly of single-shaft version of embedded hybrid electrical energy housing is intended to produce high volume of electrical energy on commercial scale. The micro wind turbine generator arrays are encompassed by robust and high efficiency solar panels. The embedded hybrid electrical energy housing with single-shaft micro wind turbine generator array is targeted to be installed on the top of railway goods wagons, and truck-trailers.

The double-shaft version of hybrid electrical energy platform is used in non-urban areas where land or open space is available. The hybrid electrical energy platform of this version is intended to produce electrical energy on commercial scale, and electrical energy is exported to local electric grids, livestock forms, and research or other remote camps.

The stator of the double-shaft micro wind generator is bolted to the baseboard in such a way that turbine heads freely rotate around the stator of the micro wind generator. Two turbine heads rotate in one direction and add up their kinetic energy vectors together because of the blade configuration is a mirror reflection to each other. The housing of the micro wind generator firmly holds the double-shaft micro wind generator to the structure on the ground behind the solar panel.

The double-shaft micro wind generator version produces more watt-hours than a single-shaft micro wind generator. The micro wind turbine drives the custom-built double-shaft micro wind generator on both ends of the micro wind generator. The micro wind generator arrays are encompassed by robust and high efficiency solar panels. Typically, the hybrid electrical energy platform height is restricted to maximum eight inches (20.32 centimeters), and the diameter of the wind turbine head is restricted to maximum eight inches (20.32 centimes). The platform is scalable for business needs.

Retrofit Usage of Double-SHA1 Micro Wind Generator Array

The Double-Shaft Micro Wind Generator Array stacks can be installed under the existing solar panels as a retrofit. The solar panels and the double-shaft micro wind generator array work independently. The retrofit version facilitates to generate more watt-hours from the existing solar farms, and increase the overall watt-hours output and profitability.

Design Features and Specifications of Mobile and Non-Mobile Versions

The micro wind turbine head comprising a ring shaped base connected to a number of curved blades, which converge at the apex of the turbine and the shaft of the micro wind turbine generator. There is no solid structure around the blades. Rotating blades will form a vortex. The dynamic balancer is a rubber ring, which is fusion bonded to flat bottom side of the micro turbine head's circular base, and becomes an integral part of the wind turbine head. It adds more weight to the micro turbine head. The primary purpose of the dynamic balancer is to extract more electrical energy from a small footprint of micro wind generator.

FIG. 7 illustrates the layout of storage batteries and smart inverter to store generated electrical energy that is not ready for export to the local grid. Based on the real-time parameters, which are voltage magnitude, phase sequence, frequency and phase angle of the distribution grid smart inverter may charge the storage batteries in the battery plant without inverting to alternating current or export to the local electric grid after inverting to alternating current.

Number 71 represents a stack of storage batteries at synchronization facility.

Number 73 represents a smart inverter.

Number 74 represents an electrical line to electric grid.

Number 75 represents the direction of current to synchronization facility.

The Embedded Platform complied with the Laws of Physics and equation. It is not a virtual platform.

Specifications of a Mobile Version

In many applications of interest the Micro wind turbine head dimensions are as follows:

Height ≤5 inches (12.7 centimeter)

Diameter ≤8 inches (20.32 centimeters)

The wind turbine head is directly coupled to the single-shaft micro wind generator.

Total height and diameter of micro wind generator and turbine:

Vertical height ≤5 inches (12.7 centimeters); Diameter ≤8 inches (20.32 centimeters)

Total height of the Embedded Electrical Energy Platform:

Vertical height ≤6 inches (15.24 centimeters)

Standard safe clearance is implemented between the moving goods train wagon/coach or moving goods truck-trailer, and the ceiling of a tunnel or a bridge.

One square meter solar panel with little curvature covers an array of 4×4 micro wind generators to form an Embedded Hybrid Electrical Energy Platform.

The hybrid electrical energy platform of mobile version is targeted to produce high volume of electricity while the train is moving at speed range from 20 to 80 miles (32 to 128 kilometers) per hour. The generated electricity is stored in a battery on the goods wagon or a passenger coach. The stored electrical energy is transmitted to a battery stack in the railway yard located at a convenient point, and exported to the local electrical grid at a later stage. One square meter of high efficiency solar panel can produce 100 to 120 watt-hours in a day. The embedded platform is a single frame. One square meter solar panel covers one square meter micro wind turbine generator array. In our tests, we observed energy generation of the order of 200 to 420 watt-hours per day.

Specifications of a Non-Mobile Version

For this application, the Micro wind turbine head dimensions typically are:

Height ≤5 inches (12.7 centimeter)

Diameter ≤8 inches (20.32 centimeters)

The wind turbine head is directly coupled to the double-shaft micro wind generator by the sleeve couplings Total height and width of micro wind generator and turbine:

Vertical height ≤10 inches (25.4 centimeters)

Diameter ≤8 inches (20.32 centimeters)

One square meter solar panel with little curvature covers an array of 4×4 micro wind generators. The completed Embedded Hybrid Electrical Platform height of this version is restricted to 11 inches (27.94 centimeters). The lightweight solar panel encompasses the entire array, and securely bolted to the baseboard of the micro wind generator array. The Embedded Hybrid Electrical Energy Platform is strong enough to withstand storm weather conditions. Rainwater or melted ice can escape through the gaps in between Hybrid Electrical Energy Platform stacks.

The lightweight solar panel that encompasses the micro wind turbine is strong enough to withstand storm weather conditions, and allows enough clearance space for the micro wind turbine's rotating parts. One square meter Embedded Hybrid Electrical Energy Platform is capable of producing up to 420 watt-hours per day.

Development Status

Prototype embedded hybrid electrical energy platform has already been developed.

Functional and operational features were tested. Single-shaft and double-shaft 12 Volts direct current generators were tested with wind turbine head directly connected to the shaft. The solar panel output voltage, functional and operational features were tested. Manufacturing facilities are available to produce high volume single-shaft and Double-Shaft 12 Volts direct current generators and turbine heads that meet the design specifications. The solar panel that meets the design specifications is also available; System of this invention is suitable for mass production.

Flexible Solar Panels

12 Volt flexible solar panels are lightweight, rollable up to 2 inches (5.08 centimeters) allowing for easy carry and fit in tight places. 12 Volt OEM series flexible modules are integrated into custom solar battery charger. Solar cell accessories, which allow extensions for longer reach from solar panel to solar battery, or to protect against higher output given from a large power source. Each thin film module performs great n well diverse environments including hot direct sunlight or cold weather temperatures. Each panel is cadmium free.

Semi Flexible Solar Panels

Mono-crystalline cells using back contact will provide high efficiency up to 23 percent. Its power output ranges from 30 to 175 watts. They use aesthetically clear surface back-contact cells. They provide excellent performance under low sunlight conditions.

Thin Film Flexible Solar Panels

Adhesive back thin film flexible solar panel can provide output up to 72 watts.

Portable Solar Panels

Portable solar panels are suitable for applications such as camping, remote research and other remote alternate silent energy requirements. These are reliable, compact, and lightweight solar panels that offer high performance solar power even in extreme environments. Portable solar panel is lightweight, thin and flexible. Its snap-top system, designed exclusively for E-Z-GO, allows for easy installation without requiring canopy replacement or structural reinforcement. Users of the panel can reduce energy costs required to charge and maintain their E-Z-GO electric vehicles by as much as 20 percent annually, depending on local weather conditions and other factors.

The panel features a snap-top installation system, exclusively designed for E-ZGO vehicles. Adding the panel can be done without special tools or any changes to the structure or aesthetics. The solar panel creates, on average, enough electricity per year to offset nearly 100 pounds of carbon dioxide emissions, according to formulas devised by the U.S. Environmental Protection Agency. Portable solar panels are light in weight, and durable. Unlike many solar products that are heavy and fragile. This type of solar panel weighs less than seven pounds and can be easily maintained Designed and manufactured using no glass, and stand up to the rigors of daily use Monocrystaline Solar Panels Monocrystalline solar panels have the highest efficiency rates. E20 series provide panel conversion efficiencies of up to 20.1 percent. Monocrystalline silicon solar panels are space-efficient. Since these solar panels yield the highest power outputs, they also require the least amount of space compared to any other any other types. Monocrystalline solar panels produce up to four times the amount of electricity as thin-film solar panels. Monocrystalline solar panels live the longest.

Maximum Power Point Tracking (MPPT)

One of the tricky things about solar cells is that voltage needs to be adjusted to light level for maximum output of power. In other words, the performance of a solar panel is dependent on the voltage, load that is applied from the inverter. MPPT is a technique used to find the right voltage and the maximum power point. When MPPT is applied to each individual panel, as opposed to the solar panel system as a whole, performance will naturally increase.

Having described the design and specification details as above, I claim:

1. A double-shaft micro wind turbine generator array with directly coupled three-dimensional micro turbine heads to enhance an electrical energy output in a solar farm comprising:

a double-shaft micro wind turbine generator comprising:
(a) two micro wind turbine heads, one of the two micro wind turbine heads directly coupled at both ends of the double-shaft micro wind generator;
(b) wherein a turbine head blade configuration of the double-shaft micro wind turbine generator are mirror reflection to each other;
(d) wherein each said blade has a tapered shape, which narrows and converges into an apex of the turbine head with a hole at the apex center;
(e) wherein the turbine head blade configuration on the shaft ends of the double-shaft micro wind turbine rotates in the same direction and adds kinetic energy vectors from top and bottom micro wind turbine heads;
(f)
(g) and wherein a solar panel covering the double-shaft micro wind turbine generator forms an air duct allowing wind to pass through the air duct to rotate the two micro turbine heads.

* * * * *